US009870048B2

(12) United States Patent
Yamazaki (10) Patent No.: US 9,870,048 B2
(45) Date of Patent: Jan. 16, 2018

(54) HEAD-MOUNTED DISPLAY DEVICE, METHOD OF CONTROLLING THE SAME, AND COMPUTER PROGRAM

(71) Applicant: SEIKO EPSON CORPORATION, Tokyo (JP)

(72) Inventor: Akio Yamazaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 15/007,705

(22) Filed: Jan. 27, 2016

(65) Prior Publication Data

US 2016/0225190 A1  Aug. 4, 2016

(30) Foreign Application Priority Data

Feb. 2, 2015  (JP) ................................. 2015-018090

(51) Int. Cl.
*G06F 3/00* (2006.01)
*G02B 27/01* (2006.01)
*G06T 11/00* (2006.01)

(52) U.S. Cl.
CPC ............. *G06F 3/005* (2013.01); *G02B 27/01* (2013.01); *G06T 11/001* (2013.01)

(58) Field of Classification Search
CPC .... G02B 27/017; G02B 27/0192; G06T 19/20
See application file for complete search history.

(56) References Cited

U.S. PATENT DOCUMENTS

2013/0234914 A1  9/2013 Fujimaki
2014/0292653 A1* 10/2014 Kamba ................. G06T 19/006
                                                      345/157

FOREIGN PATENT DOCUMENTS

JP         2013-186641 A     9/2013

* cited by examiner

*Primary Examiner* — Thomas Lett
(74) *Attorney, Agent, or Firm* — Oliff PLC (57) ABSTRACT

In a head-mounted display device equipped with a display section, through which an external world can visually be recognized, the head-mounted display device includes a superimposition image display control section adapted to make the display section display a predetermined image so as to be superimposed on the external world to visually be recognized in a see-through manner, an imaging section adapted to capture an image of at least a predetermined range out of the external world visually recognized in a see-through manner, a partial image determination section adapted to determine a partial image of a predetermined range, which corresponds in position to the predetermined image, out of the captured image obtained by the imaging section, and a visibility correction section adapted to correct visibility of the predetermined image displayed by the superimposition image display control section in accordance with color information related to the partial image determined.

7 Claims, 8 Drawing Sheets

| R | G | B | GROUP | EYE-FRIENDLY COLOR (RGB) |
|---|---|---|---|---|
| ... | ... | ... | G1 | R1,G1,B1 |
| ... | ... | ... | | |
| ... | ... | ... | | |
| ... | ... | ... | | |
| ... | ... | ... | | |
| ... | ... | ... | | |
| ... | ... | ... | | |
| ... | ... | ... | G2 | R2,G2,B2 |
| ... | ... | ... | | |
| ... | ... | ... | | |
| ... | ... | ... | | |
| ... | ... | ... | | |
| ... | ... | ... | G3 | R3,G3,B3 |
| ... | ... | ... | | |
| ... | ... | ... | | |
| ... | ... | ... | Gn | Rn,Gn,Bn |
| ... | ... | ... | | |

HEAD-MOUNTED DISPLAY DEVICE, METHOD OF CONTROLLING THE SAME, AND COMPUTER PROGRAM

BACKGROUND

1. Technical Field

The present invention relates to a head-mounted display device equipped with a display section through which the external world can visually be recognized, a method of controlling the head-mounted display device, and a computer program.

2. Related Art

In recent years, a technology called augmented reality (AR) for attaching information provided by a computer to an object in the real space has attracted attention. As one of the methods of realizing the augmented reality, there can be cited a see-through type head-mounted display device through which the external world can visually be recognized. According to the see-through type head-mounted display device, by reflecting image light generated by a light modulation element such as a liquid crystal panel by an optical system and so on disposed in front of the eyes of the user, it is possible to superimpose an image as the augmented reality on the external world visually recognized in a see-through manner (e.g., JP-A-2013-186641).

However, in the technology of the related art described above, in the case in which a color of the external world visually recognized in a see-through manner and a color of the image (hereinafter referred to as an "AR image") as the augmented reality are similar to each other, there has occurred a problem that the AR image blends into the color of the external world, and therefore it is difficult for the user to see the AR image. Besides the above, in the head-mounted display device of the related art, there are desired an improvement in convenience of the user, an improvement in detection accuracy, downsizing of the device configuration, cost reduction, resource saving, easier manufacturing process, and so on.

SUMMARY

An advantage of the invention is to solve at least a part of the problems described above, and the invention can be implemented as the following aspects.

(1) An aspect of the invention is directed to a head-mounted display device equipped with a display section, through which light from an external world can visually be recognized. The head-mounted display device includes a superimposition image display control section adapted to make the display section display a predetermined image so as to be superimposed on the external world to visually be recognized in a see-through manner, an imaging section adapted to capture an image of at least a predetermined range out of the external world visually recognized in a see-through manner, a partial image determination section adapted to determine a partial image of a predetermined range, which corresponds in position to the predetermined image, out of the captured image obtained by the imaging section, and a visibility correction section adapted to correct visibility of the predetermined image displayed by the superimposition image display control section in accordance with color information related to the partial image determined. According to the head-mounted display device of this aspect, when making a predetermined image be displayed so as to be superimposed on the external world visually recognized in a see-through manner, the visibility of the predetermined image is corrected based on the color of the external world in the predetermined range corresponding in position to the predetermined image. Therefore, it is possible to inhibit the predetermined image from blending into the color of the external world to thereby become difficult for the user to see.

(2) In the head-mounted display device having the configuration described above, the predetermined range determined as the partial image may be at least a part of an area overlapped in position with the predetermined image. According to the head-mounted display device of this aspect, the visibility of the predetermined image is corrected based on the color of at least a part of the area overlapped in position with the predetermined image. Therefore, it is possible to further inhibit the predetermined image from becoming difficult for the user to see.

(3) In the head-mounted display device having the configuration described above, the visibility correction section may include a determination section adapted to determine whether or not a color difference between a color related to the partial image and a display color of the predetermined image is smaller than a predetermined value, and the visibility correction section may correct the visibility of the predetermined image in a case in which the determination section determines that the color difference is smaller than the predetermined value. According to the head-mounted display device of this aspect, in the case in which the predetermined image has a small color difference from the color of the predetermined range, the predetermined image can be made eye-friendly.

(4) In the head-mounted display device having the configuration described above, the visibility correction section may correct a display color of the predetermined image as the correction of the visibility of the predetermined image. According to the head-mounted display device of this aspect, it becomes possible to correct the display color of the predetermined image into a color differing greatly from the color of the predetermined range. Therefore, it is possible to further inhibit the predetermined image from becoming difficult for the user to see.

(5) In the head-mounted display device having the configuration described above, the visibility correction section may perform a change to a color having a complementary relation with the color related to the partial image as the correction of the display color of the predetermined image. According to the head-mounted display device of this aspect, by changing the color to the complementary color, it becomes possible to easily make the display color of the predetermined image and the color of the predetermined range conspicuous from each other. Therefore, it is possible to further inhibit the predetermined image from becoming difficult for the user to see.

(6) In the head-mounted display device having the configuration described above, in the case in which both of the color related to the partial image and the display color of the predetermined image are low saturation colors having a saturation value lower than a predetermined value, the visibility correction section may change the display color to eye-friendly one of a white color and a black color. According to the head-mounted display device of this aspect, even in the case in which the display color of the predetermined image and the color of the predetermined range are both the low saturation colors, the predetermined image can be made eye-friendly. Therefore, it is possible to further inhibit the predetermined image from becoming difficult for the user to see.

All of the constituents provided to each of the aspects of the invention described above are not necessarily essential, and in order to solve all or part of the problems described above, or in order to achieve all or a part of the advantages described in the specification, it is possible to arbitrarily make modification, elimination, replacement with another new constituent, and partial deletion of restriction content on some of the constituents described above. Further, in order to solve all or part of the problems described above, or in order to achieve all or a part of the advantages described in the specification, it is also possible to combine some or all of the technical features included in one of the aspects of the invention with some or all of the technical features included in another of the aspects of the invention to thereby form an independent aspect of the invention.

For example, an aspect of the invention can be implemented as a device provided with at least one of the five elements, namely the display section, the superimposition image display control section, the imaging section, the partial image determination section, and the visibility correction section. In other words, it is also possible for the device to include or not to include the display section. Further, it is also possible for the device to include or not to include the superimposition image display control section. Further, it is also possible for the device to include or not to include the imaging section. Further, it is also possible for the device to include or not to include the partial image determination section. Further, it is also possible for the device to include or not to include the visibility correction section. It is possible for the display section to be, for example, a section through which the external world can visually be recognized. It is also possible for the superimposition image display control section to make the display section display the predetermined image so as to be superimposed on the external world to visually be recognized in a see-through manner. It is also possible for the imaging section to determine the partial image of the predetermined range, which corresponds in position to the predetermined image, out of the captured image obtained by the imaging section, for example. It is also possible for the partial image determination section to determine the partial image of the predetermined range, which corresponds in position to the predetermined image, out of the captured image obtained by the imaging section, for example. It is also possible for the visibility correction section to correct the visibility of the predetermined image displayed by the superimposition image display control section in accordance with the color information related to the partial image thus determined. Such a device can be implemented as, for example, a head-mounted display device, but can also be implemented as a device other than the head-mounted display device. According to such an aspect of the invention, it is possible to solve at least one of a variety of problems such as an improvement in convenience of the user, an improvement in detection accuracy, downsizing of the device configuration, cost reduction, resource saving, and easier manufacturing process. Some or all of the technical features of the head-mounted display device described above as each of the aspects of the invention can be applied to this device.

The invention can be implemented in a variety of forms other than the head-mounted display device. The invention can be implemented as the forms such as a display device, a method of controlling a head-mounted display device, a method of controlling the display device, a head-mounted display system, a display system, a computer program for implementing the function of the head-mounted display system, a recording medium on which the computer program is recorded, a computer program for implementing the function of the display system, and a recording medium on which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Basic Configuration of Head-Mounted Display Device

Figure 1:
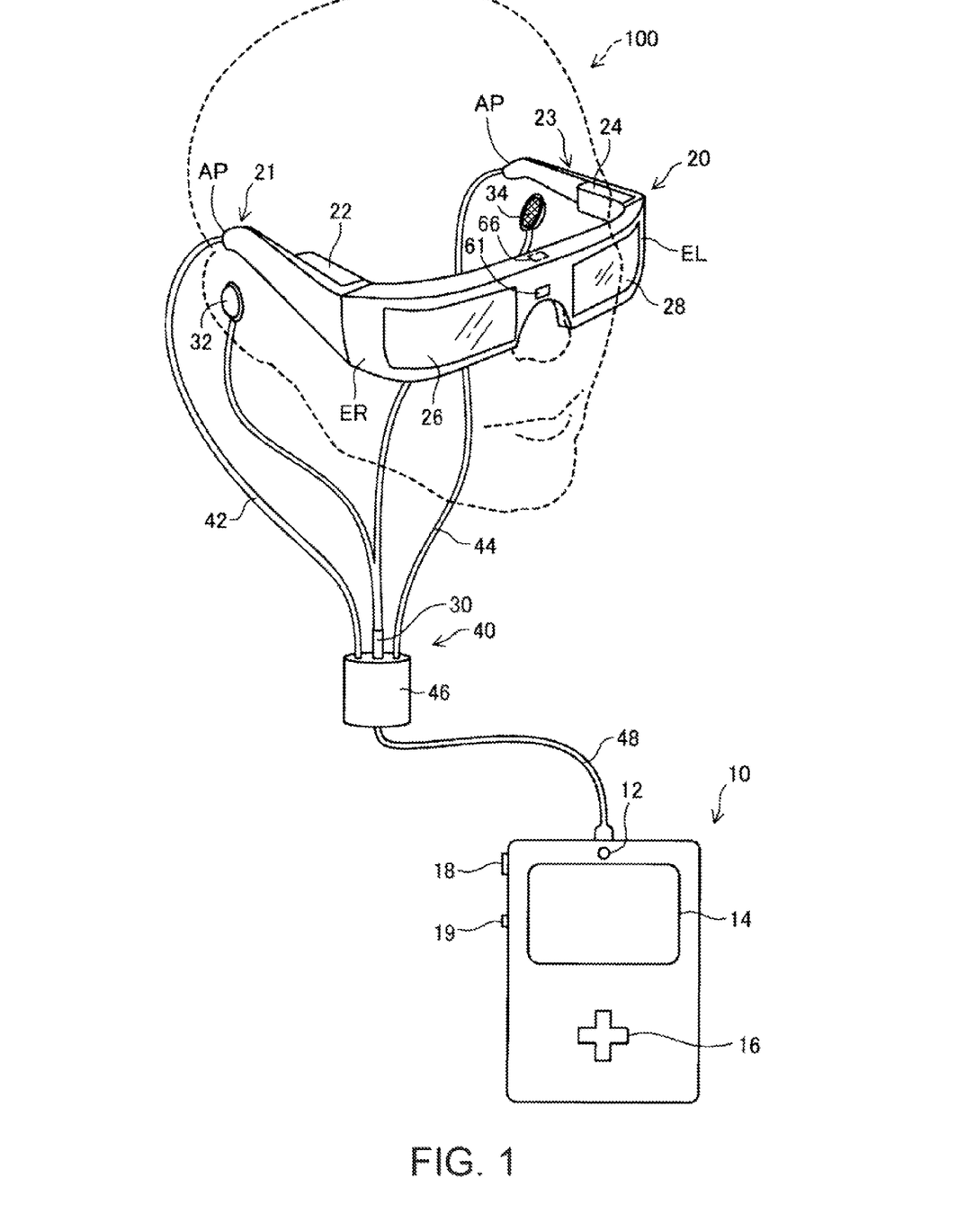
FIG. 1 is an explanatory diagram showing a schematic configuration of a head-mounted display device (HMD) according to a first embodiment of the invention.

FIG. 1 is an explanatory diagram showing a schematic configuration of a head-mounted display device according to a first embodiment of the invention. The head-mounted display device 100 is a display device to be mounted on the head, and is also called a head-mounted display (HMD). The HMD 100 is a see-through type head-mounted display device in which an image is superimposed on or overlaid with the external world visually recognized through a pair of glasses.

The HMD 100 is provided with an image display section 20 for making the user visually recognize the virtual image in the state of being mounted on the head of the user, and a control section (a controller) 10 for controlling the image display section 20.

The image display section 20 is a mounted body to be mounted on the head of the user, and is shaped like a pair of glasses in the present embodiment. The image display section 20 includes a right holding section 21, a right display drive section 22, a left holding section 23, a left display drive section 24, a right optical image display section 26, and a left optical image display section 28. The right optical image display section 26 and the left optical image display section 28 are disposed so as to be located in front of the right and left eyes of the user, respectively, when the user wears the image display section 20. One end of the right optical image display section 26 and one end of the left optical image display section 28 are connected to each other at a position corresponding to the glabella of the user when the user wears the image display section 20.

The right holding section 21 is a member disposed so as to extend from an end portion ER, which is the other end of the right optical image display section 26, to a position corresponding to a temporal region of the user when the user wears the image display section 20. Similarly, the left holding section 23 is a member disposed so as to extend from an end portion EL, which is the other end of the left optical image display section 28, to a position corresponding to a temporal region of the user when the user wears the image display section 20. The right holding section 21 and the left holding section 23 hold the image display section 20 on the head of the user in such a manner as the temples of the pair of glasses hold the pair of glasses.

The right display drive section 22 is disposed on an inner side of the right holding section 21, in other words, on the side to be opposed to the head of the user when the user wears the image display section 20. Further, the left display drive section 24 is disposed on the inner side of the left holding section 23. It should be noted that hereinafter, the right holding section 21 and the left holding section 23 will be explained as "holding sections" without discrimination. Similarly, the right display drive section 22 and the left display drive section 24 will be explained as "display drive sections" without discrimination, and the right optical image display section 26 and the left optical image display section 28 are explained as "optical image display sections" without discrimination.

The display drive sections respectively include liquid crystal displays 241, 242 (hereinafter referred to as "LCD"), projection optical systems 251, 252, and so on (see FIG. 2). The details of the configuration of the display drive sections will be described later. The optical image display sections as optical members respectively include light guide plates 261, 262 (see FIG. 2), and dimming plates. The light guide plates 261, 262 are each formed of a light transmissive resin material or the like, and guide the image light output from the display drive sections to the eyes of the user, respectively. The dimming plates are each a thin-plate like optical element, and are disposed so as to cover the obverse side (the side opposite to the side of the eyes of the user) of the image display section 20. The dimming plates protect the light guide plates 261, 262 to inhibit damages, adhesion of dirt, and so on to the light guide plates 261, 262, respectively. Further, by controlling the light transmittance of the dimming plate, an amount of the outside light entering the eye of the user is controlled, and thus, the easiness of the visual recognition of the virtual image can be controlled. It should be noted that the dimming plates can be eliminated.

The image display section 20 further includes a connection section 40 for connecting the image display section 20 to the control section 10. The connection section 40 includes a main body cord 48 to be connected to the control section 10, a right cord 42 and a left cord 44 obtained by branching the main body cord 48 into two, and a connecting member 46 disposed at the branch point. The right cord 42 is inserted into the housing of the right holding section 21 from a tip portion AP in the extending direction of the right holding section 21, and is connected to the right display drive section 22. Similarly, the left cord 44 is inserted into the housing of the left holding section 23 from a tip portion AP in the extending direction of the left holding section 23, and is connected to the left display drive section 24. The connecting member 46 is provided with a jack to which the earphone plug 30 is connected. A right earphone 32 and a left earphone 34 extend from the earphone plug 30.

The image display section 20 and the control section 10 perform transmission of various signals via the connection section 40. An end portion of the main body cord 48 on the opposite side to the connecting member 46 and the control section 10 are provided with respective connectors (not shown) to be connected to each other, and the control section 10 and the image display section 20 are connected to each other or separated from each other in accordance with engagement/disengagement of the connector of the main body cord 48 and the connector of the control section 10. As the right cord 42, the left cord 44, and the main body cord 48, there is adopted, for example, a metal cable or an optical fiber.

The control section 10 is a device for controlling the HMD 100. The control section 10 includes a lighting section 12, a touch pad 14, arrow keys 16, and a power switch 18. The lighting section 12 gives notice of the operating state (e.g., ON/OFF of the power) of the HMD 100 with the light emitting state thereof. As the lighting section 12, there can be used, for example, a light emitting diode (LED). The touch pad 14 detects a touch operation on the operation surface of the touch pad 14 to output a signal corresponding to the detection content. As the touch pad 14, there can be adopted a variety of types of touch pad such as an electrostatic type, a pressure-detection type, or an optical type. The arrow keys 16 detect a holding-down operation to any of the keys corresponding to up, down, right, and left directions, and then output a signal corresponding to the detection content. The power switch 18 detects a sliding operation of the switch to thereby switch the state of the power of the HMD 100.

Figure 2:
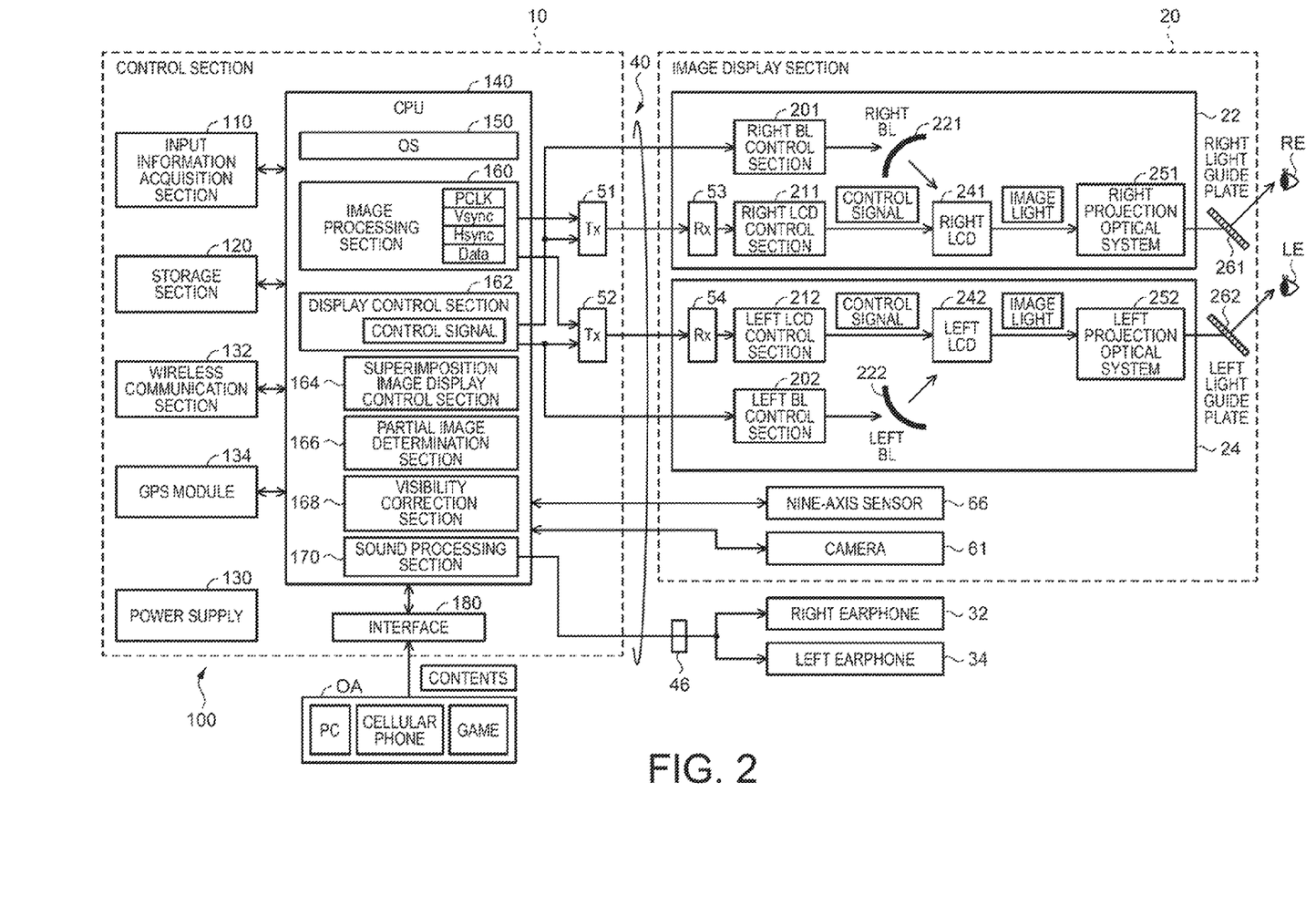
FIG. 2 is a block diagram functionally showing the configuration of the HMD.

FIG. 2 is a block diagram functionally showing a configuration of the HMD 100. The control section 10 is provided with an input information acquisition section 110, a storage section 120, a power supply 130, a wireless communication section 132, a GPS module 134, a CPU 140, an interface 180, and transmitting sections (Tx) 51 and 52, and these components are connected to each other via a bus not shown.

The input information acquisition section 110 obtains signals corresponding to the respective operation inputs to, for example, the touch pad 14, the arrow keys 16, and the power switch 18. The storage section 120 is constituted by a ROM, a RAM, a DRAM, a hard disk, or the like.

The power supply 130 supplies each of the sections of the HMD 100 with the electrical power. As the power supply 130, there can be used a secondary cell such as a lithium polymer battery or a lithium ion battery. Further, it is possible to adopt a primary cell or a fuel cell instead of the secondary cell, or it is also possible to arrange that the sections of the HMD 100 operate while receiving wireless power feed. Further, it is also possible to receive the power feed from a solar cell and a capacitor. The wireless communication section 132 performs wireless communication with other equipment under a predetermined wireless communication standard such as wireless LAN, Bluetooth (registered trademark), or iBeacon (registered trademark). The GPS module 134 receives signals from GPS satellites to thereby detect the own current position.

The CPU 140 retrieves and then executes computer programs stored in the storage section 120 to thereby function as an operating system (OS) 150, an image processing section 160, a display control section 162, a superimposition image display control section 164, a partial image determination section 166, a visibility correction section 168, and a sound processing section 170.

The image processing section 160 generates a signal based on the contents (pictures) input via the interface 180 and the wireless communication section 132. Further, the image processing section 160 supplies the image display section 20 with the signal thus generated via the connection section 40 to thereby control the image display section 20. The signal to be supplied to the image display section 20 is different between an analog system and a digital system. In the case of the analog system, the image processing section 160 generates and then transmits a clock signal PCLK, a vertical sync signal VSync, a horizontal sync signal HSync, and image data Data. Specifically, the image processing section 160 obtains the image signal included in the content. In the case of, for example, a moving image, the image signal thus obtained is an analog signal generally composed of 30 frames of images per second. The image processing section 160 separates the sync signals such as the vertical sync signal VSync and the horizontal sync signal HSync from the image signal thus obtained, and then generates the clock signal PCLK in accordance with the periods of these sync signals using a PLL circuit and so on. The image processing section 160 converts the analog image signal, from which the sync signals are separated, into a digital image signal using an A/D conversion circuit and so on. The image processing section 160 stores the digital image signal obtained by the conversion into a DRAM in the storage section 120 frame by frame as the image data Data of RGB data.

In contrast, in the case of the digital system, the image processing section 160 generates and then transmits the clock signal PCLK, and the image data Data. Specifically, in the case in which the content is for the digital system, since the clock signal PCLK is output in sync with the image signal, the generation of the vertical sync signal VSync and the horizontal sync signal HSync, and the A/D conversion of the analog image signal become unnecessary. It should be noted that it is also possible for the image processing section 160 to perform image processing such as a resolution conversion process, a variety of color correction processes of, for example, adjustment of luminance and saturation, or a keystone distortion correction process on the image data Data stored in the storage section 120.

The image processing section 160 transmits the clock signal PCLK, the vertical sync signal VSync, and the horizontal sync signal HSync thus generated, and the image data Data stored in the DRAM in the storage section 120 via each of the transmitting sections 51, 52. It should be noted that the image data Data transmitted via the transmission section 51 is also referred to as "right eye image data Data1," and the image data Data transmitted via the transmission section 52 is also referred to as "left eye image data Data2." The transmitting sections 51, 52 function as transmitters for serial transmission between the control section 10 and the image display section 20.

The display control section 162 generates control signals for controlling the right display drive section 22 and the left display drive section 24. Specifically, the display control section 162 controls switching ON/OFF the drive of a right LCD 241 by a right LCD control section 211, switching ON/OFF the drive of a right backlight 221 by a right backlight control section 201, switching ON/OFF the drive of a left LCD 242 by a left LCD control section 212, switching ON/OFF the drive of a left backlight 222 by a left backlight control section 202, and so on individually using the control signals to thereby control generation and emission of the image light by each of the right display drive section 22 and the left display drive section 24. The display control section 162 transmits the control signals to the right LCD control section 211 and the left LCD control section 212 via the transmitting sections 51, 52, respectively. Similarly, the display control section 162 transmits the control signals to the right backlight control section 201 and the left backlight control section 202, respectively.

The superimposition image display control section 164 makes the image as the augmented reality be displayed so as to correspond to the position of the external world visually recognized through the optical image display sections 26, 28. The superimposition image display control section 164 implements the invention in cooperation with the partial image determination section 166 and the visibility correction section 168. Configurations of the superimposition image display control section 164, the partial image determination section 166, and the visibility correction section 168 will be described later in detail.

The sound processing section 170 obtains a sound signal included in the content, amplifies the sound signal thus obtained, and then supplies the result to a speaker not shown in the right earphone 32 and a speaker not shown in the left earphone 34 connected to the connecting member 46. It should be noted that in the case of, for example, adopting a Dolby (registered trademark) system, a treatment to the sound signal is performed, and sounds with, for example, modified frequencies, and thus different from each other are output respectively from the right earphone 32 and the left earphone 34.

The interface 180 is an interface for connecting a variety of types of external equipment OA to be a supply source of contents to the control section 10. As the external equipment OA, there can be cited, for example, a personal computer PC, a cellular phone terminal, and a game terminal. As the interface 180, there can be used, for example, a USB interface, a micro USB interface, and an interface for a memory card.

The image display section 20 is provided with the right display drive section 22, the left display drive section 24, the right light guide plate 261 as the right optical image display section 26, the left light guide plate 262 as the left optical image display section 28, a camera 61 (see also FIG. 1), and a nine-axis sensor 66.

The camera 61 is an RGB camera, and is disposed at a position corresponding to a nasal root portion of the user when the user wears the image display section 20. Therefore, the camera 61 captures a color image (including a moving picture) of the external world in a predetermined direction of the HMD 100, namely the direction to which the user faces in the state in which the user wears the image display section 20 on the head. It should be noted that as the camera 61, a monochrome camera can be adopted instead of the RGB camera.

The nine-axis sensor 66 is a motion sensor for detecting accelerations (three axes), angular velocities (3 axes), and geomagnetisms (3 axes), and is disposed at a position corresponding to the glabella of the user in the present embodiment. The nine-axis sensor 66 is provided to the image display section 20, and therefore detects a motion of the head of the user when the image display section 20 is mounted on the head of the user. The orientation of the image display section 20, namely the view field of the user, is identified from the motion of the head thus detected.

The right display drive section 22 includes a receiving section (Rx) 53, the right backlight (BL) control section 201 and the right backlight (BL) 221 functioning as a light source, the right LCD control section 211 and the right LCD 241 functioning as a display element, and a right projection optical system 251. It should be noted that the right backlight control section 201, the right LCD control section 211, the right backlight 221, and the right LCD 241 are also collectively referred to as an "image light generation section."

The receiving section 53 functions as a receiver for serial transmission between the control section 10 and the image display section 20. The right backlight control section 201 drives the right backlight 221 based on the control signal input to the right backlight control section 201. The right backlight 221 is a light emitter such as an LED or electroluminescence (EL). The right LCD control section 211 drives the right LCD 241 based on the clock signal PCLK, the vertical sync signal VSync, the horizontal sync signal HSync, and right-eye image data Data1 input via the receiving section 53. The right LCD 241 is a transmissive liquid crystal panel having a plurality of pixels arranged in a matrix. The right LCD 241 varies the transmittance of the light transmitted through the right LCD 241 by driving the liquid crystal corresponding to each of the pixel positions arranged in a matrix to thereby modulate the illumination light, which is emitted from the right backlight 221, into valid image light representing the image.

The right projection optical system 251 is formed of a collimating lens for converting the image light emitted from the right LCD 241 into a light beam in a parallel state. The right light guide plate 261 as the right optical image display section 26 guides the image light, which has been output from the right projection optical system 251, to the right eye RE of the user while reflecting the image light along a predetermined light path. As the optical image display section, there can be used an arbitrary system as long as a virtual image is formed in front of the eye of the user using the image light, and for example, a diffraction grating can also be used, or a semi-transmissive reflecting film can also be used. It should be noted that in the present specification, emission of the image light by the HMD 100 is also referred to as "display of the image."

The left display drive section 24 has substantially the same configuration as that of the right display drive section 22. Specifically, the left display drive section 24 includes a receiving section (Rx) 54, the left backlight (BL) control section 202 and the left backlight (BL) 222 functioning as a light source, the left LCD control section 212 and the left LCD 242 functioning as a display element, and a left projection optical system 252. Similarly to the right LCD 241, the left LCD 242 varies the transmittance of the light transmitted through the left LCD 242 by driving the liquid crystal located at each of the pixel positions arranged in a matrix to thereby modulate the illumination light, which is emitted from the left backlight 222, into valid image light representing the image. It should be noted that although it is assumed in the present embodiment that the backlight system is adopted, it is also possible to emit the image light using a front light system or a reflecting system.

A-2. Regarding Augmented Reality Display

Figure 3:
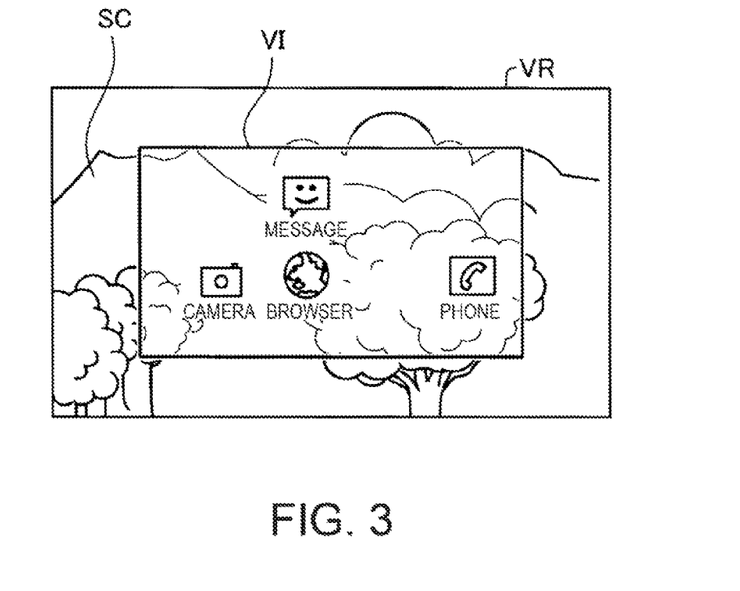
FIG. 3 is an explanatory diagram showing an example of augmented reality display by the HMD.

FIG. 3 is an explanatory diagram showing an example of the augmented reality display by the HMD 100. In FIG. 3, a visual field VR of the user is shown as an example. By the image light guided to both eyes of the user of the HMD 100 being imaged on the retinas of the user in such a manner as described above, the user can visually recognize the image VI as the augmented reality (AR). In the example shown in FIG. 3, the image VI is a standby screen of the OS of the HMD 100. Further, by the optical image display sections 26, 28 transmitting the light from the external world SC, the user visually recognizes the external world SC. As described above, it is possible for the user of the HMD 100 according to the present embodiment to see the image VI and the external world SC behind the image VI with respect to a part of the visual field VR in which the image VI is displayed. Further, regarding a part of the visual field VR in which the image VI is not displayed, the external world SC alone can be seen.

Figure 4:
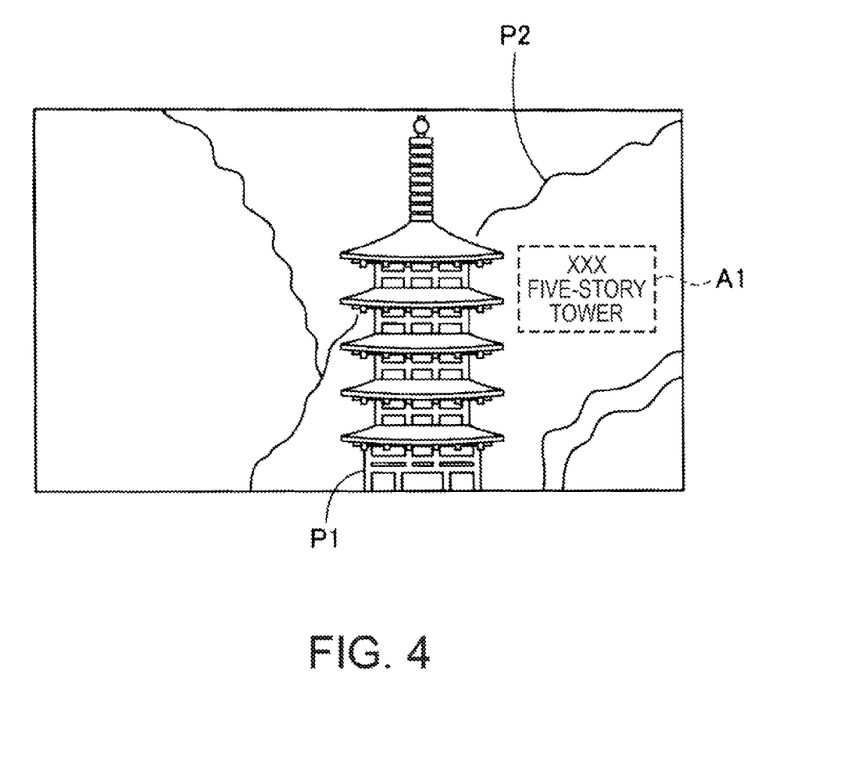
FIG. 4 is an explanatory diagram showing another example of the augmented reality display by the HMD.

FIG. 4 is an explanatory diagram showing another example of the augmented reality display by the HMD 100. The drawing shows an example of the visual field VR of the user similarly to FIG. 3. The external world to be visually recognized includes a five-story tower P1 and a forest P2. It is possible for the user to visually recognize a caption (e.g., a name) A1 of the five-story tower P1 as the augmented reality while superimposing the caption A1 on the external world. For example, during the period of observing the five-story tower P1 in the state of driving a tourist guiding application, it is possible to obtain the presentation of the caption A1 from the tourist guiding application.

The display position of the caption A1 is made to correspond to the position of the five-story tower P1 as the object in the external world to visually be recognized in a see-through manner. The control section 10 visually recognizes the external world from the image captured by the camera 61. Therefore, highly accurate alignment between the position in the external world and the display position in the image display section 20 becomes necessary. In the present embodiment, the alignment is achieved using the following method. The CPU 140 visually recognizes a reference actual object corresponding to a calibration image via the camera 61 to follow the reference actual object while making the image display section 20 display the calibration image. In this state, the user moves the position of the calibration image on the image display section 20 via the user interface (e.g., the track pad 14). Then, at the timing when the user senses overlap (rough coincidence in at least one of the position, the size, and the orientation) between the calibration image and the reference actual object via the image display section 20, the user gives notification to the CPU 140 via the user interface. The CPU 140 obtains parameters corresponding to the detection result (e.g., the position in the captured image) of the reference actual object at that timing, and the display position of the calibration image on the image display section 20 in accordance with the notification thus obtained, and then performs the alignment based on the parameters.

In the example shown in FIG. 4, the caption A1 is made to correspond to the five-story tower P1, and is displayed so as to be superimposed on the forest P2. The character color of the caption A1 is a predetermined color, for example, black, and in the case in which the character color is black, the caption A1 blends into the dark green color of the forest P2. As a result, when keeping the predetermined color, the caption A1 is not eye-friendly for the user. Therefore, in the present embodiment, the control section 10 changes the character color of the caption A1 to thereby perform the correction of the eye-friendliness of the caption A1. The change of the color is achieved by the superimposition image display control section 164, the partial image determination section 166, and the visibility correction section 168 in cooperation with each other. The sections 164 through 168 are functionally implemented by the CPU 140 executing a predetermined program stored in the storage section 120. The details of the predetermined program will hereinafter be explained.

Figure 5:
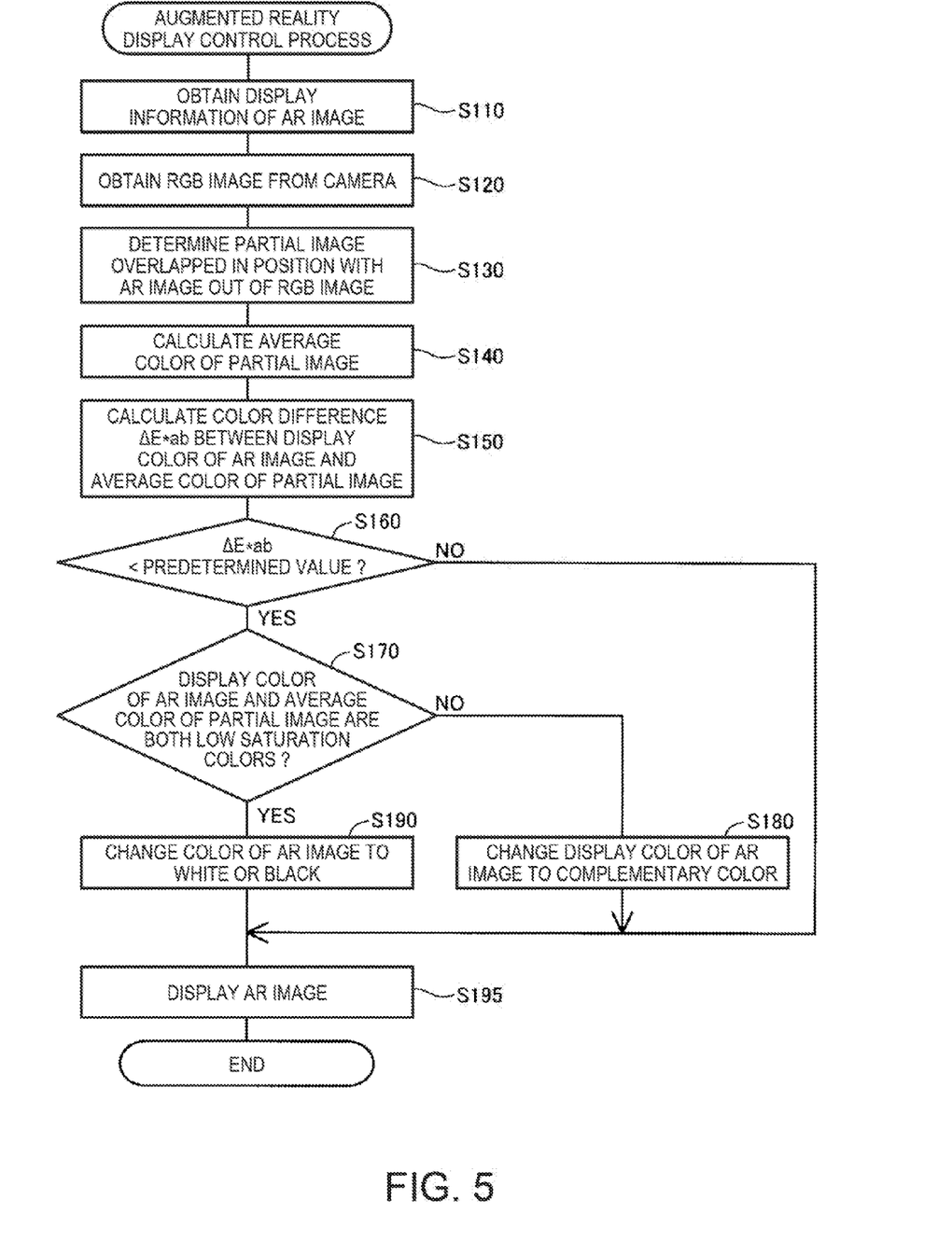
FIG. 5 is a flowchart showing an augmented reality display control process.

FIG. 5 is a flowchart showing an augmented reality display control process. The augmented reality display control process corresponds to the predetermined program, and is executed by the CPU 140 when a request to display the image (the AR image) as the augmented reality occurs. When the process is started, the CPU 140 firstly obtains (step S110) display information for displaying the AR image transmitted from another application. The display information includes the content (e.g., characters, symbols, diagrams, pictures, and paintings) of the AR image, the display size, the display color, the display position, and so on. In the present embodiment, the content of the AR image is character data constituting a character string. The display color is data defined by RGB. In the present embodiment, the display color is the character color. The display position is data for defining the display area using a two-dimensional position coordinate in a two-dimensional space viewed through the optical image display sections 26, 28. In the present embodiment, the display area is assumed to have a rectangular shape, and the display position is defined by the two-dimensional position coordinates respectively representing vertices of the rectangle. Further, in the range defined by the rectangle, a part other than the characters is defined as a visually transparent part. Further, although in the present embodiment, a common display color is assigned throughout the character string, the character color can be different between the characters.

Then, the CPU 140 obtains (step S120) the RGB image from the camera 61. Subsequently, the CPU 140 determines (step S130) the partial image of the range corresponding to the display position obtained in the step S110 from the RGB image thus obtained. Since the camera 61 is for capturing an image of the external world visually recognized by the user wearing the image display section 20 as described above, the partial image determined in the step S120 becomes to represent the entire area overlapped in position with the AR image, in the external world to be visually recognized. In the present embodiment, the display area of the AR image has the rectangular shape as described above, and the entire rectangle is determined as the partial image. In the example shown in FIG. 4, the range described with the dotted line is determined as the partial image.

Subsequently, the CPU 140 calculates (step S140) an average color of the partial image determined in the step S130. The average color corresponds to average values of the RGB values of the respective pixels constituting the partial image. The average values of the RGB values are the average values of the respective colors of RGB.

Subsequently, the CPU 140 calculates (step S150) a color difference between the display color of the AR image obtained in the step S110 and the average color of the partial image calculated in the step S140. In the present embodiment, the RGB values as the display color of the AR image and the RGB values as the average color of the partial image are respectively converted into L*a*b* values in the L*a*b* color system, and then the color difference ΔE*ab between the L*a*b* values is obtained. The conversion method into the L*a*b* values, and the method of obtaining the color difference ΔE*ab have known configurations, and the detailed explanation thereof will be omitted.

Although in the present embodiment, it is arranged that the RGB values are converted into the L*a*b* values, and then the color difference ΔE*ab is obtained in order to obtain the color difference, an arrangement that the RGB values are converted into L*C*h* values, and then the color difference is obtained can also be adopted instead of the arrangement described above. In essence, any configuration can be adopted instead thereof providing the color difference between the display color values of the AR image and the average color of the partial image can be obtained.

Subsequently, the CPU 140 determines (step S160) whether or not the color difference ΔE*ab calculated in the step S110 is smaller than a predetermined value. The predetermined value corresponds to a threshold value with which a human looking at two colors recognizes that the two colors are difficult to distinguish from each other, and is a value obtained in advance by an experiment in the present embodiment.

In the case in which it has been determined in the step S160 that the color difference ΔE*ab is smaller than the predetermined value, the CPU 140 determines (step S170) whether or not both of the display color of the AR image obtained in the step S110 and the average color of the partial image calculated in the step S140 are low saturation colors. In the L*a*b* color system, since the saturation is represented by the a* value and the b* value, by using the a* value and the b* value, it becomes possible to determine whether or not there occurs the low saturation color, the saturation of which is lower than a predetermined value. The low saturation color is a grayish color, and the predetermined value as the threshold value for the determination is a value obtained in advance by an experiment.

In the case in which it is determined in the step S170 that it is not true that both of the display color of the AR image and the average color of the partial image are the low saturation colors, namely at least one of the display color of the AR image and the average color of the partial image is not the low saturation color, the display color of the AR image is changed (step S180) to the complementary color. The "complementary color" is a combination of colors having a relationship of being located on the opposite sides in the color circle, and it becomes possible to make the colors the most conspicuous. Therefore, by changing the display color of the AR image to the complementary color, the AR image can be prevented from blending into the background of the external world. It should be noted that in the case in which the AR image and the background are both low in saturation, even the complementary color fails to become an "eye-friendly color" in reality. Therefore, in the present embodiment, the change to the complementary color is performed only in the case in which it has been determined in the step S170 that at least one of the AR image and the partial image is not the low saturation color ("NO" determination).

In contrast, in the case in which it has been determined in the step S170 that the display color of the AR image and the average color of the partial image are both the low saturation colors, the CPU 140 changes (step S190) the display color of the AR image to eye-friendly one of white and black. In the selection between white and black, one having a greater difference in luminance from the partial image is selected. Here, the luminance of the partial image denotes an average value of the luminance values of the respective pixels constituting the partial image. Due to the process in the step S190, the AR image becomes to have a conspicuous difference in luminance from the partial image, and there is no chance for the AR image to blend into the background of the external world.

After executing the step S180 or the step S190, the CPU 140 displays (step S195) the AR image. In detail, the AR image is displayed using the color having been changed in the step S180 or the step S190 as the display color, and using the display information having been obtained in the step S110 except the display color. After displaying the AR image, the augmented reality display control process is terminated.

In the case in which it has been determined in the step S160 that the color difference $\Delta E^*ab$ is equal to or larger than the predetermined value, the process immediately proceeds to the step S195 to perform the display of the AR image. In other words, the display of the AR image is performed without changing the display color of the AR image.

In the augmented reality display control process configured as described hereinabove, the process in the steps S110 and S195 corresponds to the superimposition image display control section 164, the process in the steps S120 and S130 corresponds to the partial image determination section 166, and the process in the steps S140 through S190 corresponds to the visibility correction section 168.

A-3. Regarding Advantages of Embodiment

According to the HMD 100 related to the first embodiment configured as described hereinabove, when displaying the AR image so as to be superimposed on or overlaid with the external world visually recognized through the optical image display sections 26, 28, the color of the AR image is corrected based on the color of the external world in the predetermined range corresponding to the display position of the AR image. Therefore, it is possible to inhibit the color of the AR image from blending into the color of the external world to thereby become difficult for the user to see. In particular in the present embodiment, in the case in which it has been determined that the display color of the AR image and the average color of the partial image are both the low saturation colors, the display color of the AR image is changed to eye-friendly one of white and black colors, and in the case in which it has been determined that at least one of the display color of the AR image and the average color of the partial image is not the low saturation color, the display color of the AR image is changed to the complementary color. Therefore, the visibility of the AR image related to the partial image is improved.

For example, in the example shown in FIG. 4, the character color of the caption A1 is changed to white to thereby improve the visibility related to the dark green color of the forest P2. Therefore, according to the HMD 100 related to the first embodiment, it is possible to further inhibit the AR image from becoming difficult for the user to see.

B. Second Embodiment

Then, a second embodiment of the invention will be explained. A head-mounted display device according to the second embodiment is different in the point that a color classification table is provided, and in the content of the augmented reality display control process, and is the same in the rest of the points compared to the head-mounted display device according to the first embodiment. The same parts will be denoted by the same reference symbols as those in the first embodiment, and the explanation thereof will be omitted.

Figure 6:
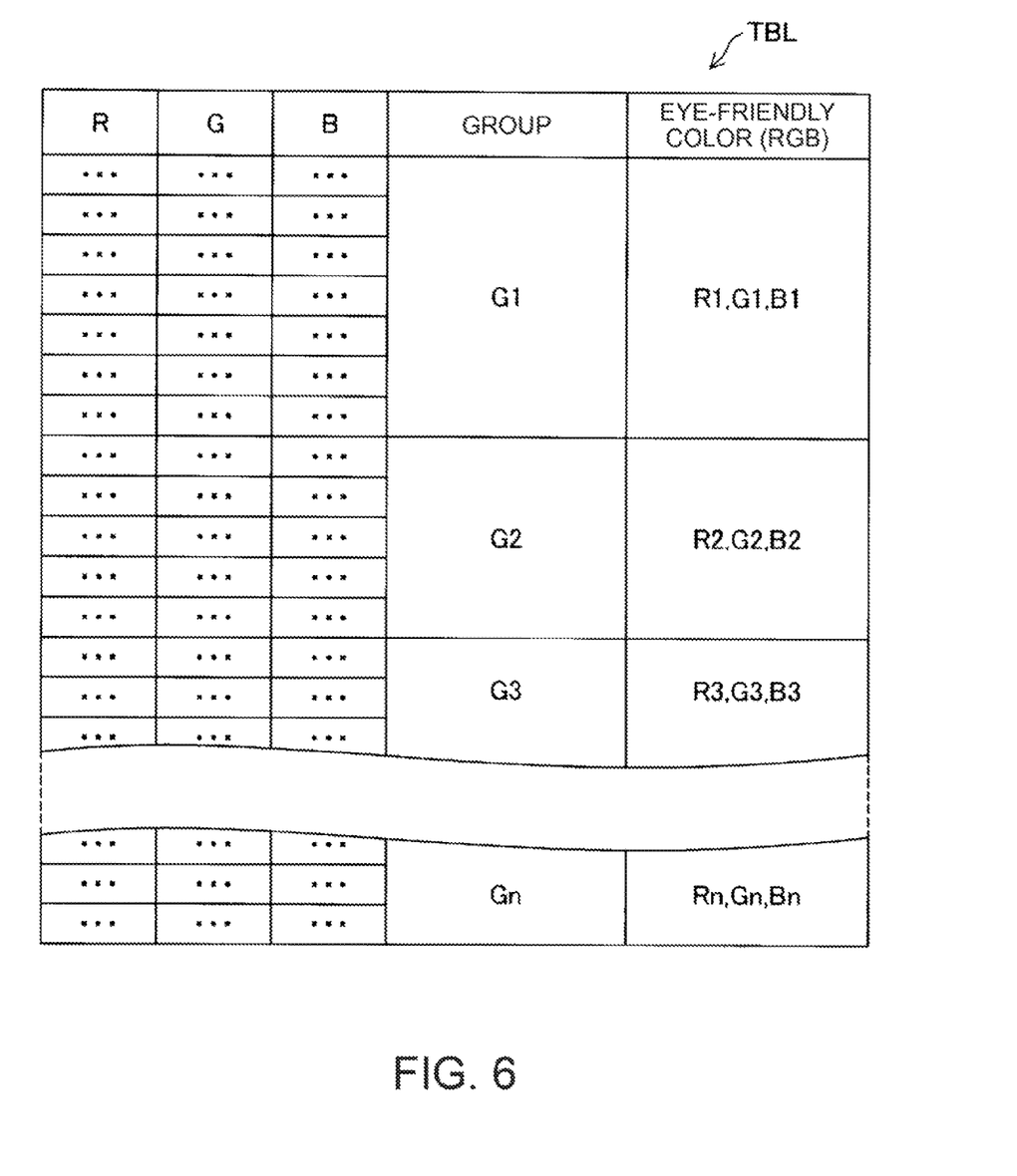
FIG. 6 is an explanatory diagram showing a color classification table.

FIG. 6 is an explanatory diagram showing a color classification table TBL. As shown in the drawing, in the color classification table TBL, there are registered all of the color data defined by the R value, the G value, and the B value. The color data are classified into n (an integer equal to or greater than 2) groups G1, G2, . . . , and Gn. The classification is done so that the similar color data are obtained. The "similar color data" denote the data satisfying the condition that the color difference between two color data is smaller than a predetermined value. The "color difference" and the "predetermined value" can be obtained using a method similar to the steps S150 and S160 in the augmented reality display control process (FIG. 5) in the first embodiment.

With the groups G1 through Gn, there are associated colors (the RGB values) which are eye-friendly when superimposed, respectively. The eye-friendly colors can be obtained in advance by an experiment. The color classification table TBL is stored in the storage section 120.

Figure 7:
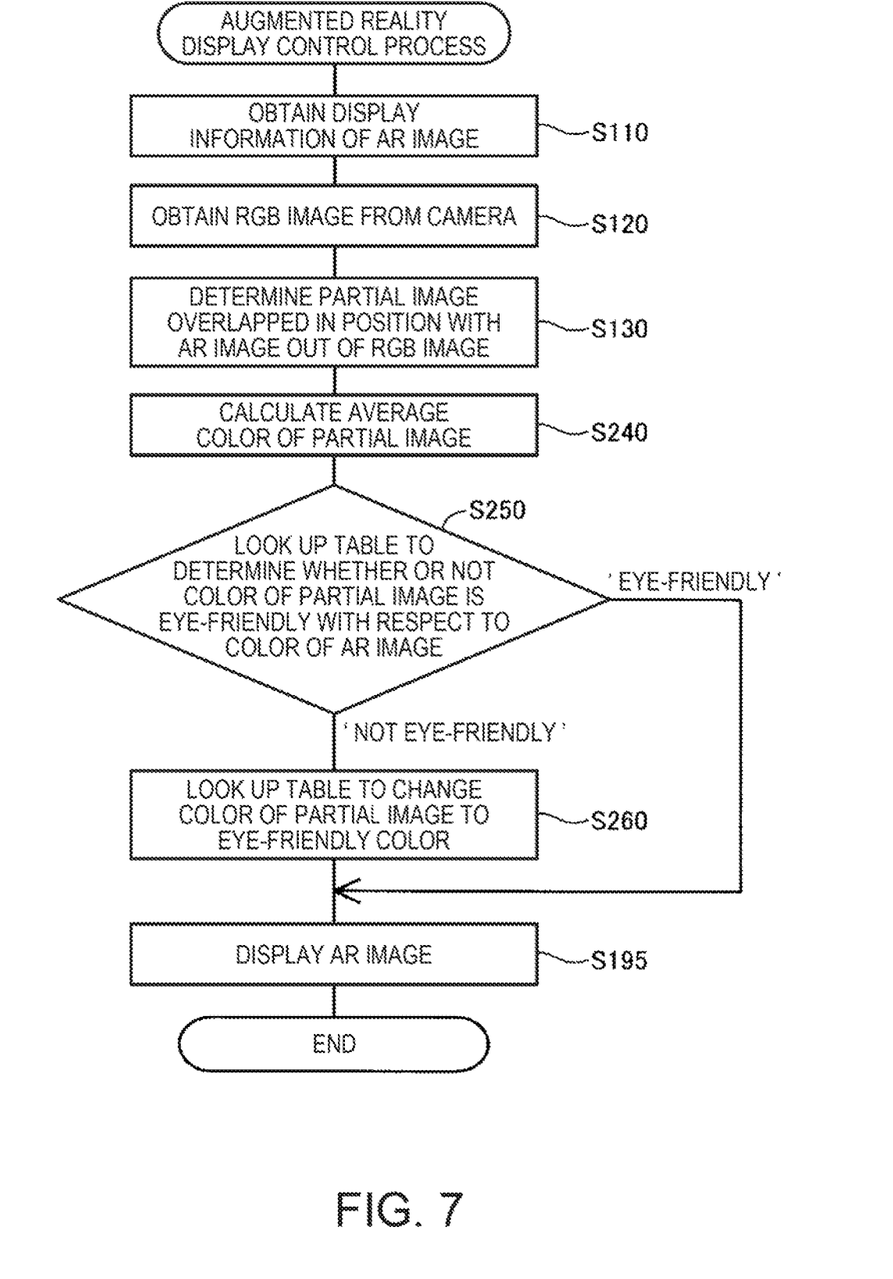
FIG. 7 is a flowchart showing an augmented reality display control process in a second embodiment of the invention.

FIG. 7 is a flowchart showing an augmented reality display control process in the second embodiment. Similarly to the first embodiment, the augmented reality display control process is executed by the CPU 140 when a request to display the AR image occurs. When the process is started, the CPU executes the process of the steps S110 through S140 identical to those in the augmented reality display control process (FIG. 5) of the first embodiment. Subsequently, the CPU 140 determines (step S250) whether or not the display color of the AR image obtained in the step S110 and the average color of the partial image calculated in the step S140 are the similar color data. The determination is made based on whether or not the RGB values of the display color of the AR image and the RGB values of the average color of the partial image belong to the same group with reference to the color classification table TBL.

In the case in which it has been determined in the step S250 that the colors belong to the same group, and are therefore the similar color data, the CPU 140 obtains the eye-friendly color (the RGB values) associated with that group by looking up the color classification table TBL, and then changes (step S260) the display color of the AR image to the eye-friendly color thus obtained. Subsequently, the CPU 140 displays (step S195) the AR image similarly to the first embodiment. In detail, the AR image is displayed using the color having been changed in the step S260 as the display color, and using the display information having been obtained in the step S110 except the display color. After displaying the AR image, the augmented reality display control process is terminated.

In contrast, in the case in which it has been determined in the step S250 that the display color of the AR image and the average color of the partial image do not belong to the same group, and are therefore not the similar color data, the process immediately proceeds to the step S195 to perform the display of the AR image. In other words, the display of the AR image is performed without changing the display color of the AR image.

According to the HMD related to the second embodiment configured as described hereinabove, similarly to the first embodiment, it is possible to inhibit the color of the AR image from blending into the color of the external world to become difficult for the user to see.

As a first modified example of the second embodiment, it is possible to replace the process of the step S250 with the steps S150 and S160 in the first embodiment. Further, as a second modified example of the second embodiment, it is possible to replace the process of the step S260 with the process of the steps S170 through S190 shown in FIG. 5 in the first embodiment.

C. Modified Examples

It should be noted that the invention is not limited to the first and second embodiments, and modified examples thereof described above, but can be implemented in a variety of forms within the scope or the spirit of the invention, and the following modifications, for example, are also possible.

C-1. Modified Example 1

Figure 8A:
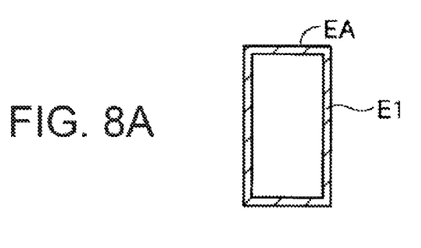
FIGS. 8A through 8E are explanatory diagrams showing Modified Example 1.
Figure 8B:
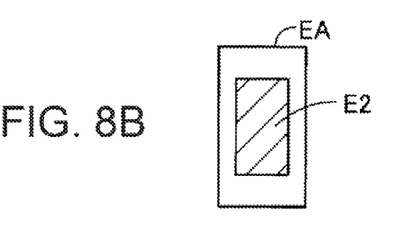
Figure 8C:
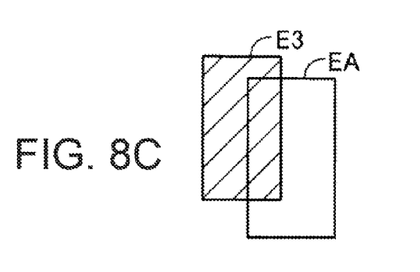
Figure 8D:
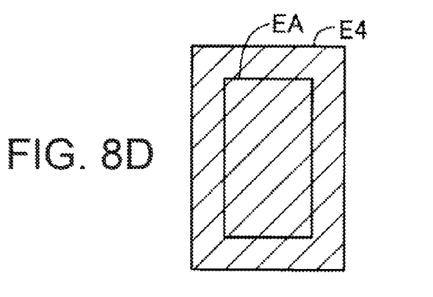
Figure 8E:
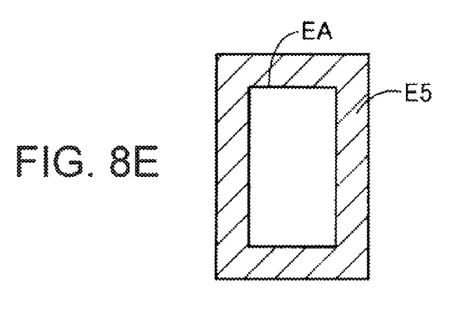

Although in the first and second embodiments, the partial image the color of which is compared with the display color of the AR image is the entire area overlapped in position with the AR image in the external world visually recognized, the partial image is not limited to this configuration, but can also be set to any position as long as the position is in a predetermined range in which the position corresponds to the AR image. For example, as shown in FIG. 8A, the partial image can also be an outer circumferential part (the hatched part) E1 of the area EA overlapped in position with the AR image. Further, as shown in FIG. 8B, the partial image can also be a part (the hatched part) E2 inside the area EA overlapped in position with the AR image. As shown in FIG. 8C, the partial image can also be an area (the hatched part) E3 a part of which overlaps a part of the area EA overlapped in position with the AR image. As shown in FIG. 8D, the partial image can also be an area (the hatched part) E4 including the area EA inside, the area EA being overlapped in position with the AR image. As shown in FIG. 8E, the partial image can also be a frame area (the hatched part) E5 having a rectangular shape surrounding the area EA overlapped in position with the AR image from the outside.

C-2. Modified Example 2

Although in the first and second embodiments, by changing the display color of the AR image, it is performed to correct the visibility of the AR image related to the external world, it is also possible to correct the visibility of the AR image by performing blinking display of the AR image instead thereof. Further, it is also possible to arrange that the color of only the outline of the AR image, for example, the outline of the characters is changed. In essence, any configuration can be adopted as long as the visibility of the AR image related to the external world is corrected.

C-3. Modified Example 3

Although in the first and second embodiment, it is assumed that the AR image to be superimposed on the external world as the augmented reality is the character data, symbol data, graphic data such as a pictogram or an icon, or still image data such as a painting or a picture can also be adopted instead of the character data. Further, it is also possible to adopt moving image data instead of the still image data described above. In the case in which the AR image includes a plurality of display colors, or the case in which the AR image is composed of the pixels of a plurality of colors, the process shown in FIG. 5 and the process shown in FIG. 7 can be performed for each of the pixels or each of the pixels blocks of the AR image, and further, in the case of the moving image, the process shown in FIG. 5 or the process shown in FIG. 7 can also be performed for each of the frames constituting the moving image.

C-4. Modified Example 4

Although in the first and second embodiments, it is assumed that the color information related to the partial image is the average color of the partial image, it is also possible to obtain the largest number of RGB values out of the pixels constituting the partial image and adopt the largest number of RGB values as the color information related to the partial image instead of the average value. In essence, any value can be adopted providing the value is color information corresponding to the color as a whole of the partial image.

C-5. Other Modified Examples

In each of the descriptions of the embodiments described above, the configuration of the head-mounted display is described as an example. However, the configuration of the head-mounted display can arbitrarily be determined within the scope or the spirit of the invention, and addition, elimination, replacement, and so on of each of the constituents can be made.

The assignment of the constituents to the control section and the image display section in the embodiment described above is illustrative only, and a variety of configurations can be adopted. For example, the following configurations can also be adopted.

(i) The configuration in which processing functions of the CPU, the memory, and so on are installed in the control section, and only a display function is installed in the image display section.

(ii) The configuration in which the processing functions of the CPU, the memory, and so on are installed in both of the control section and the image display section.

(iii) The configuration in which the control section and the image display section are integrated with each other (e.g., the configuration in which the image display section includes the control section to function as a wearable computer shaped like a pair of glasses).

(iv) The configuration in which a smartphone or a portable gaming machine is used instead of the control section.

(v) A configuration of providing the control section and the image display section with a constitution capable of wireless communication and wireless power supply to thereby eliminate the connection section (cords).

In each the embodiments described above, it is assumed that the control section is provided with the transmitting sections, and the image display section is provided with the receiving sections for the sake of convenience of explanation. However, each of the transmitting sections and the receiving sections of the embodiments described above is provided with a function capable of bidirectional communication, and can function as a transmitting and receiving section. Further, for example, it is assumed that the control section shown in FIG. 2 is connected to the image display section via the wired signal transmission channel. However, it is also possible for the control section and the image display section to be connected to each other with the connection via a wireless signal transmission channel such as a wireless LAN, infrared communication, or Bluetooth (registered trademark).

For example, the configurations of the control section and the image display section described in the above description of the embodiments can arbitrarily be modified. Specifically, it is also possible to adopt a configuration of, for example, eliminating the touch pad from the control section, and performing the operations only with the arrow keys. Further, it is also possible to provide the control section with other operating interfaces such as an operating stick. Further, it is also possible to adopt a configuration capable of connecting devices such as a keyboard or a mouse to the control section to thereby receive an input from the keyboard or the mouse. Further, for example, besides the operation input using the touch pad and the arrow keys, it is possible to obtain the operation input using a foot switch (a switch operated by a foot of the user). It is also possible to detect the sight line of the user to obtain the operation input due to a command associated with the movement of the sight line after providing a sight line detection section such as an infrared sensor to, for example, the image display section. It is also possible to detect a gesture of the user using, for example, a camera to obtain the operation input by the command associated with the gesture. When performing the gesture detection, a ring attached to a finger of the user, a medical device held by the user with a hand, or the like can be used as a mark for the motion detection. By making it possible to obtain the operation input by the foot switch or the sight line, it is possible for the input information acquisition section to obtain the operation input from the user even in the work difficult for the user to disengage the hand.

Figure 9A:
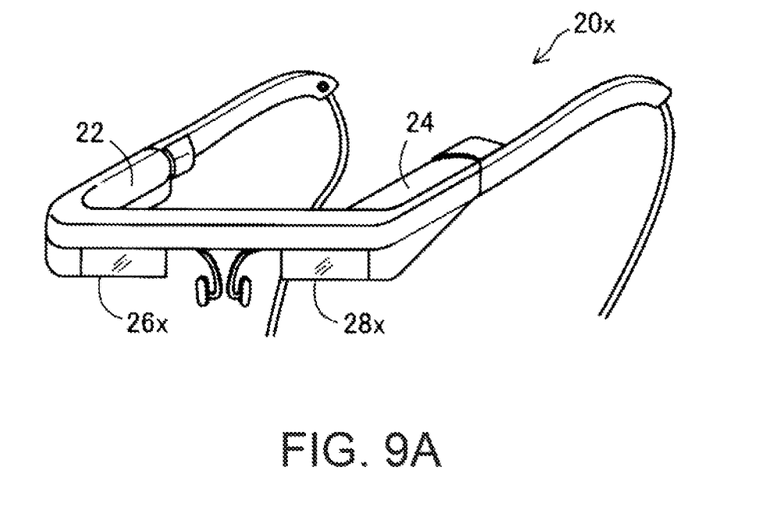
FIGS. 9A and 9B are explanatory diagrams each showing an exterior configuration of an HMD according to another modified example.
Figure 9B:
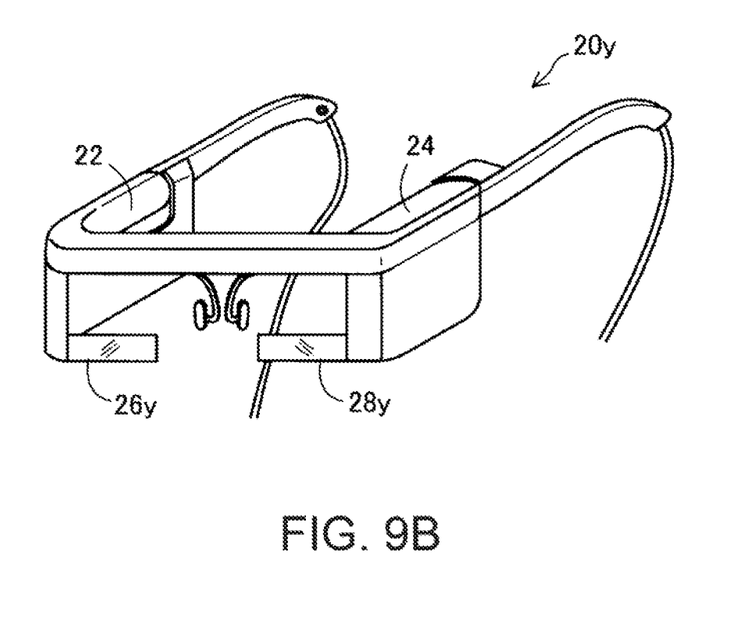

FIGS. 9A and 9B are explanatory diagrams each showing an exterior configuration of the HMD according to a modified example. In the case of the example shown in FIG. 9A, an image display section 20x is provided with a right optical image display section 26x instead of the right optical image display section 26, and is provided with a left optical image display section 28x instead of the left optical image display section 28. The right optical image display section 26x and the left optical image display section 28x are formed to be smaller than the optical members of the embodiments described above, and are disposed obliquely above the right eye and the left eye of the user, respectively, when wearing the HMD. In the case of the example shown in FIG. 9B, an image display section 20y is provided with a right optical image display section 26y instead of the right optical image display section 26, and is provided with a left optical image display section 28y instead of the left optical image display section 28. The right optical image display section 26y and the left optical image display section 28y are formed to be smaller than the optical members of the embodiments described above, and are disposed obliquely below the right eye and the left eye of the user, respectively, when wearing the HMD. As described above, it is sufficient for each of the optical image display sections to be disposed in the vicinity of the eye of the user. Further, the size of the optical member forming each of the optical image display sections is arbitrarily determined, and it is possible to implement the HMD having a configuration in which the optical image display sections each cover only a part of the eye of the user, in other words, the configuration in which the optical image display sections each do not completely cover the eye of the user.

For example, although it is assumed that the head-mounted display is a binocular type transmissive head-mounted display, a monocular type head-mounted display can also be adopted. Further, it is also possible for the head-mounted display to be configured as a non-transmissive head-mounted display in which the transmission of the external sight is blocked in the state in which the user wears the head-mounted display.

The functional sections such as the image processing section, the display control section, and the sound processing section are described assuming that these sections are implemented by the CPU developing the computer program, which is stored in the ROM or the hard disk, on the RAM, and then executing the computer program. However, it is also possible for these functional sections to be configured using an application specific integrated circuit (ASIC) designed for implementing the functions.

For example, although in the embodiments described above, it is assumed that the head-mounted display has the image display section to be worn like a pair of glasses, it is also possible to assume that the image display section is a normal planar display device (e.g., a liquid crystal display device, a plasma display device, or an organic EL display device). Also in this case, the connection between the control section and the image display section can be a connection via the wired signal transmission channel, or can be a connection via the wireless signal transmission channel. According to this configuration, the control section can be used as a remote controller for the normal planar display device.

Further, it is also possible to adopt an image display section having another shape such as an image display section to be worn like a cap as the image display section instead of the image display section to be worn like a pair of glasses. Further, as the earphones, an ear hook type or a headband type can also be adopted, or the earphones can also be eliminated. Further, it is also possible to adopt a configuration as a head-up display (HUD) to be installed in a moving object such as a vehicle or a plane. Further, it is also possible to adopt a configuration as a head-mounted display incorporated in a body protector such as a helmet.

For example, in the embodiment described above, it is assumed that the display drive sections are each configured using the backlight, the backlight control section, the LCD, the LCD control section, and the projection optical system. However, the configuration described above is illustrative only. It is also possible for the display drive section to be provided with a constituent for implementing another system together with or instead of these constituents. For example, it is also possible for the display drive section to have a configuration including an organic EL (organic electroluminescence) display, an organic EL control section, and the projection optical system. For example, it is also possible for the display drive section to use a digital micromirror device (DMD) or the like instead of the LCD. For example, it is also possible for the display drive section to be configured so as to include a signal light modulation section including colored light sources for generating the respective colored light beams of RGB and relay lenses, a scanning optical system including an MEMS mirror, and a drive control circuit for driving these constituents. Even in the case of using the organic EL, the DMD, or the MEMS mirror, the fact remains that an "emission area in the display drive section" is the area where the image light is actually emitted from the display drive section, and by controlling the emission area in each device (the display drive section) in substantially the same manner as in the embodiments described above, substantially the same advantages as those of the embodiments described above can be obtained. Further, for example, it is possible for the display drive section to be configured so as to include one or more lasers for emitting the laser with the intensity corresponding to the image signal to the retina of the user. In this case, the "emission area in the display drive section" expresses an area where the laser beam representing the image is actually emitted from the display drive section. By controlling the emission area of the laser beam in the laser (the display drive section) in substantially the same manner as in the embodiments described above, substantially the same advantages as those of the embodiments can be obtained.

The invention is not limited to the embodiments, specific examples, and the modified examples described above, but can be implemented with a variety of configurations within the scope or the spirit of the invention. For example, the technical features in the embodiments, the practical examples, and the modified examples corresponding to the technical features in the aspects described in the SUMMARY section can arbitrarily be replaced or combined in order to solve all or a part of the problems described above, or in order to achieve all or a part of the advantages described above. Further, the technical feature can arbitrarily be eliminated unless described in the specification as an essential element.

The entire disclosure of Japanese Patent Application No. 2015-018090 is incorporated by reference herein.

What is claimed is:

1. A head-mounted display device equipped with a display through which light from an external world can be visually recognized through, the head-mounted display device comprising:
at least one processor or circuit configured to:
obtain an image captured by a camera;
determine, out of the captured image, a partial image of a predetermined range out of the external world visually recognized in a see-through manner, which corresponds in position to a display position of a predetermined image;
determine whether or not a color difference between a color related to the partial image and a display color of the predetermined image is smaller than a predetermined color difference value; and
in a case in which the at least one processor or circuit determines that the color difference between the color related to the partial image and the display color is smaller than the predetermined color difference value: (i) correct visibility of the predetermined image in accordance with color information related to the determined partial image, and (ii) control the display to display the corrected predetermined image so as to be superimposed on the external world visually recognized in the see-through manner.

2. The head-mounted display device according to claim 1, wherein the predetermined range determined as the partial image is at least a part of an area overlapped in position with the predetermined image.

3. The head-mounted display device according to claim 1, wherein the at least one processor or circuit is further configured to correct the display color of the predetermined image as the correction of the visibility of the predetermined image.

4. The head-mounted display device according to claim 3, wherein the at least one processor or circuit is further configured to change the display color of the predetermined image to a color having a complementary relation with the display color of the partial image as the correction of the display color of the predetermined image.

5. The head-mounted display device according to claim 3, wherein in a case in which both of the color related to the partial image and the display color of the predetermined image are low saturation colors having a saturation value lower than a predetermined saturation value, the at least one processor or circuit changes the display color of the predetermined image to an eye-friendly one of a white color and a black color.

6. A method of controlling a head-mounted display device equipped with a display through which light from an external world can be visually recognized through, the method comprising:
obtaining an image captured by a camera; of at least a predetermined range out of the external world visually recognized in a see-through manner;
determining, out of the captured image, a partial image of a predetermined range out of the external world visually recognized in a see-through manner, which corresponds in position to a display position of a predetermined image;
determining whether or not a color difference between a color related to the partial image and a display color of the predetermined image is smaller than a predetermined color difference value; and
in a case in which the at least one processor or circuit determines that the color difference between the color related to the partial image and the display color is smaller than the predetermined color difference value:
(i) correcting visibility of the predetermined image in accordance with color information related to the determined partial image, and (ii) controlling the display to display the corrected predetermined image so as to be superimposed on the external world visually recognized in the see-through manner.

7. A non-transitory computer readable medium comprising computer-executable instructions that, when executed by a processor of a head-mounted display device equipped with a display through which light from an external world can be transmitted through, controls the processor of the head-mounted display device to:
obtain an image captured by a camera;
determine, out of the captured image, a partial image of a predetermined range out of the external world visually recognized in a see-through manner, which corresponds in position to a display position of a predetermined image;
determine whether or not a color difference between a color related to the partial image and a display color of the predetermined image is smaller than a predetermined color difference value; and
in a case in which the at least one processor or circuit determines that the color difference between the color related to the partial image and the display color is smaller than the predetermined color difference value:
(i) correct visibility of the predetermined image in accordance with color information related to the determined partial image, and (ii) control the display to display the corrected predetermined image so as to be superimposed on the external world visually recognized in the see-through manner.

* * * * *